UNITED STATES PATENT OFFICE.

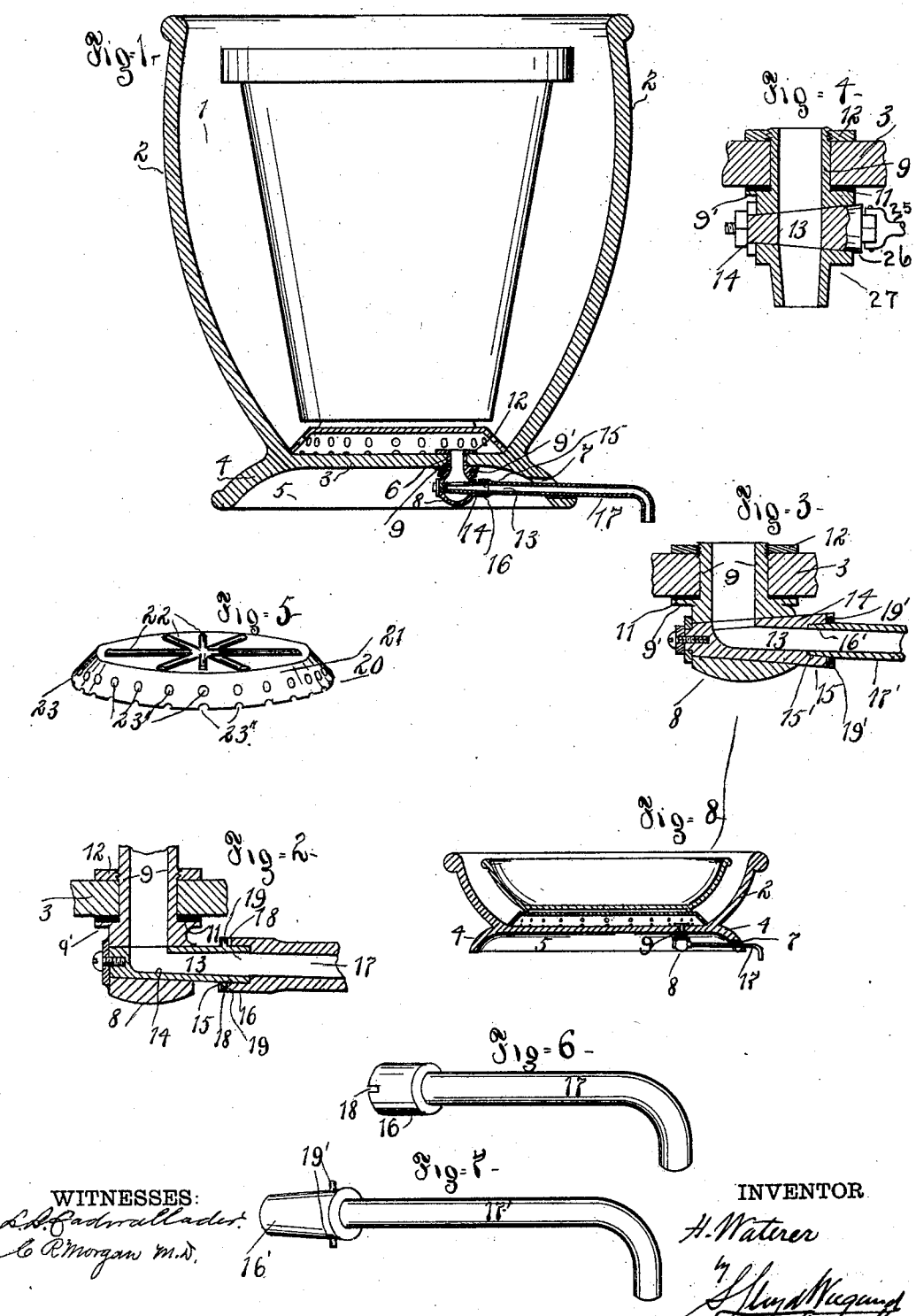

HOSEA WATERER, OF PHILADELPHIA, PENNSYLVANIA.

JARDINIERE.

SPECIFICATION forming part of Letters Patent No. 603,492, dated May 3, 1898.

Application filed March 29, 1897. Renewed January 20, 1898. Serial No. 667,357. (No model.)

*To all whom it may concern:*

Be it known that I, HOSEA WATERER, a citizen of the United States, residing at Philadelphia, in the county of Philadelphia and State of Pennsylvania, have invented certain new and useful Improvements in Jardinières; and I do hereby declare the following to be a sufficiently full, clear, and exact description thereof as to enable others skilled in the art to make and use the said invention.

This invention relates to jardinières for containing the pots of growing plants for ornamental purposes, and has for its object the greater facility of watering and caring for such plants with the least risk of injury to them or the jardinière or of soiling surrounding furniture, carpets, or floors in furnished apartments wherein such plants are usually displayed.

To this end this invention consists of a jardinière having a cavity under the bottom, an aperture through the bottom for drainage, a specially-constructed faucet and key for controlling the drainage, and an elastic perforated metallic stand for supporting the flower-pot containing the plant above the bottom of the jardinière and for preventing concussion between the flower-pot and the jardinière and also for protecting the faucet from foreign bodies which might obstruct or stop it.

The construction and operation of the invention are hereinafter fully described, and shown in the accompanying drawings, in which—

Figure 1 shows a vertical section of a jardinière embodying my invention with a flower-pot placed therein. Fig. 2 shows an enlarged section of one form of the faucet for controlling the drainage, the tube 9 being provided with a screw-thread of greater diameter than the upwardly-projecting end thereof. Fig. 3 shows in section another form thereof. Fig. 4 shows yet another form thereof, also in section. Fig. 5 shows an enlarged perspective view of the elastic stand for supporting the flower-pot. Fig. 6 is a perspective view of the combined key and discharge-tube for the faucet depicted in Fig. 2; and Fig. 7, a like view of the combined key and discharge-tube for the faucet shown in Fig. 3, except that the conical end is larger than the tube 17'. Fig. 8 shows a low and flat form of the invention adapted to table decoration.

Referring to the drawings, 1 represents the chamber of the jardinière, having sides 2, a bottom 3, and a base-rim 4, inclosing a space 5. The bottom 3 is nearly or quite flat, and in it is an outlet-opening 6, provided with a faucet hereinafter described. Through the rim 4, near the opening 6, is an opening 7. A faucet 8, having a screw-threaded inlet-tube 9 and shoulder 9', is fitted in the opening 7, with a gasket 11 of soft material, such as india-rubber, between the shoulder 9' and the under side of the bottom 3 and held in position by a nut 12, so that the upper end of the tube 9 projects slightly into the chamber 1, above the bottom 3.

The waterway or channel 13 of the faucet 8 is made centrally through the larger end of the plug 14.

In the faucet shown in Figs. 1 and 2 the head 15 of the plug 14 is made conical on the outer surface, and upon it fits fluid-tight a socket 16, forming the end of a bent tube 17. Notches 18, cut in the larger end of the socket 16, engage pins 19, inserted in the head 15 of the plug 14, and cause the plug 14 to turn with the socket 16 and tube 17. The axes of the faucet 8 and the socket 16 and tube 17 are inclined downwardly, so that water empties completely from the waterway 13 when the faucet is closed.

In the faucet shown in Fig. 3 the head 15 of the plug 14 has a conical cavity 15' in it, into which fits the conical end 16' of the tube 17', and pins 19', inserted in the cone 16', engage in notches 19' in the head 15 of the plug 14 and operate to turn the plug 14, with the plug 17', which also is downwardly inclined for the same purpose as that previously described. The faucet is so inserted that tube and key 17 pass in through the opening 7 and fit on the head 15 of the plug 14.

The stand 20 is formed as a flat ductile-metal plate 21, with radial ribs 22 raised on the upper side, so as to permit water to flow outwardly from the central opening in the bottom of the flower-pot, and with a downwardly and outwardly inclined rim 23, having perforations 23' in it and notches 23" in the lower edge to permit water to flow to the outlet 6.

Constructed as above described the jardinière can be filled with water and the water withdrawn entirely or to any desired extent without moving the plant, and the bloom of the most delicate plants can remain undisturbed without interrupting the proper supply of water and drainage. When such jardinières are used upon pedestals containing a waste-water receptacle, a straightway faucet 27, such as is shown in Fig. 4, may be used and turned with a key 25, applied through the opening 7 to the head 26 of the faucet 27.

The ductile plate-metal support 20 for the flower-pot provides for the free egress of water from the flower-pot when it is required to be drained and is valuable in protecting the jardinière from breakage in placing the flower-pot in it by preventing the flower-pot from coming into contact directly with the bottom and by yielding by reason of its ductile and elastic properties at the point of contact of the rim 23 with the bottom 3, so as to distribute the weight and shock (if the pot is dropped) upon the entire circumference of the bottom 3, where it is strengthened by the rim 4 and sides 2, thus greatly reducing the risk of breakage of the jardinière.

Having described my invention and the operation thereof, what I claim is—

1. In a jardinière for containing decorative plants in pots, a vessel having a chamber 1, a bottom 3, and a chamber 5, inclosed by a rim 4, having an opening therein, adjacent to an opening 6, in the bottom, in combination with a faucet inserted in the opening 6, and a tube adapted to enter the opening 7, and act as a key to said faucet, substantially as set forth.

2. In a jardinière a flat-bottomed chamber, having an opening in the bottom adjacent to one side, a lower supporting-rim inclosing a bottom chamber with a perforation in said rim adjacent to said opening, and a faucet inserted in the bottom opening in combination with a ductile metallic stand provided with a rim resting on or near the circumference of the bottom for the purpose of supporting the flower-pot and protecting the jardinière from shock and breakage as set forth.

3. In a jardinière a flat-bottomed chamber having an opening therein adjacent to one side in combination with a faucet having a vertical receiving branch, and a downwardly-inclined discharge branch, through the plug, with a discharge-tube fitting detachably the inclined discharge branch, and provided with pins and notches arranged to turn the plug by means of the discharge-tube as set forth.

HOSEA WATERER.

Witnesses:
C. R. MORGAN,
S. LLOYD WIEGAND.